United States Patent
Blais et al.

(10) Patent No.: US 11,255,748 B2
(45) Date of Patent: Feb. 22, 2022

(54) METHODS AND SYSTEMS FOR MEASUREMENT OF COMPONENTS

(71) Applicant: PRATT & WHITNEY CANADA CORP., Longueuil (CA)

(72) Inventors: Mario Blais, Varennes (CA); Clement Drouin Laberge, Terrebonne (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 224 days.

(21) Appl. No.: 16/541,256

(22) Filed: Aug. 15, 2019

(65) Prior Publication Data
US 2021/0048370 A1    Feb. 18, 2021

(51) Int. Cl.
*G01M 13/00* (2019.01)

(52) U.S. Cl.
CPC .................................. *G01M 13/00* (2013.01)

(58) Field of Classification Search
CPC .................................................... G01M 13/00
See application file for complete search history.

(56) References Cited

U.S. PATENT DOCUMENTS

| 4,879,671 | A | * | 11/1989 | Rieder | .................. | H03M 1/207 |
| | | | | | | 702/97 |
| 7,576,347 | B2 | | 8/2009 | Harding | | |
| 7,925,073 | B2 | | 4/2011 | Hakim et al. | | |
| 9,880,107 | B2 | | 1/2018 | Chen et al. | | |

* cited by examiner

*Primary Examiner* — Manuel L Barbee
(74) *Attorney, Agent, or Firm* — Norton Rose Fulbright Canada LLP (57) ABSTRACT

The present disclosure relates to methods and systems for measuring a component. First measurements for a plurality of features of the component are obtained from a first measurement instrument. Second measurements for at least one of the plurality of features of the component are obtained from a second measurement instrument, the second measurement instrument having a higher measurement resolution than the first measurement instrument. A scaling factor for the at least one of the plurality of features, which relates the first measurements to the second measurements, is determined. Scaled measurements for the plurality of features of the component are generated by applying the scaling factor to the first measurements. The scaled measurements are output as measurements of the component.

20 Claims, 5 Drawing Sheets

METHODS AND SYSTEMS FOR MEASUREMENT OF COMPONENTS

TECHNICAL FIELD

The present disclosure relates to techniques for obtaining measurements of components.

BACKGROUND OF THE ART

There exist a variety of settings in which it may be useful or beneficial to acquire measurements for one or more properties of a component. For example, in a manufacturing or production setting, measurements can be acquired and verified to ensure quality and suitability of components for use in assembly of products, delivery of services, and the like. Different instruments can be used to obtain measurements of properties of a component, which can operate using mechanical, optical, electrical, and/or magnetic principles. The instruments can produce measurement results, which are indicative of the measured properties of the component.

Measurement instruments have a certain degree of uncertainty, depending on the type of instrument and the principles by which it operates. When selecting a measurement instrument, there can be trade-offs between speed of acquisition and precision of measurement results.

Therefore, improvements are needed.

SUMMARY

In accordance with a broad aspect, there is provided a method of measuring a component. First measurements for a plurality of features of the component are obtained from a first measurement instrument. Second measurements for at least one of the plurality of features of the component are obtained from a second measurement instrument, the second measurement instrument having a higher measurement resolution than the first measurement instrument. A scaling factor for the at least one of the plurality of features, which relates the first measurements to the second measurements, is determined. Scaled measurements for the plurality of features of the component are generated by applying the scaling factor to the first measurements. The scaled measurements are output as measurements of the component.

In accordance with another broad aspect, there is provided a system for measuring a component. The system comprises a processing unit, and a non-transitory computer-readable medium communicatively coupled to the processing unit and comprising computer-readable program instructions. The program instructions are executable by the processing unit for: obtaining first measurements for a plurality of features of the component from a first measurement instrument; obtaining second measurements for at least one of the plurality of features of the component from a second measurement instrument, the second measurement instrument having a higher measurement resolution than the first measurement instrument; determining a scaling factor for the at least one of the plurality of features which relates the first measurements to the second measurements; generating scaled measurements for the plurality of features of the component by applying the scaling factor to the first measurements; and outputting the scaled measurements as measurements of the component.

In accordance with a further broad aspect, there is provided a system for measuring a component. The system comprises a first measurement instrument having a first measurement resolution. The first measurement instrument is configured for obtaining first measurements for a plurality of features of the component. The system also comprises a second measurement instrument having a second measurement resolution higher than the first measurement resolution. The second measurement instrument is configured for obtaining second measurements for at least one of the plurality of features of the component. The system further comprises a processing system which is configured for: determining a scaling factor for the at least one of the plurality of features which relates the first measurements to the second measurements; generating scaled measurements for the plurality of features of the component by applying the scaling factor to the first measurements; and outputting the scaled measurements as measurements of the component.

Features of the systems, devices, and methods described herein may be used in various combinations, in accordance with the embodiments described herein.

DESCRIPTION OF THE DRAWINGS

Reference is now made to the accompanying figures in which.

It will be noted that throughout the appended drawings, like features are identified by like reference numerals.

DETAILED DESCRIPTION

Herein described are methods and systems for measuring a component. The present disclosure considers various types of measurement instruments. In some embodiments, the instruments include mechanical instruments, for instance calipers, scales, gauges, levels, ultrasound scanners, and the like, to produce measurements regarding properties of components. In some other embodiments, the instruments include optical instruments, which make use of laser-based scanners, infra-red scanners, and/or other scanning devices, to produce measurements regarding properties of the components. For example, scanning devices can be used to measure the dimensions of a particular component. Other types of instruments are also considered.

Measurement instruments as considered herein are said to have a "measurement resolution". In some embodiments, the measurement resolution is indicative of the precision of measurements acquired by the instrument. For example, the measurement resolution is indicative of a minimum dimensions of a physical feature of a component under inspection which can be distinguished by a measurement instrument. In another example, the measurement resolution is indicative of a maximum number of data points collectable by a measurement instrument over a predetermined time period, for a predetermined area or volume, for a particular physical feature of a component under inspection, or the like. In some other embodiments, the measurement resolution is indicative of a sensitivity of the measurement instrument. Other interpretations are also considered. Different instruments can have varying measurement resolutions. For example, a first scanner can have a measurement resolution of approximately 1 mm, and a second scanner can have a measurement resolution of approximately 1 µm. In another example, a first weigh scale can have a measurement resolution of 1 g, and a second weigh scale can have a measurement resolution of 1 mg.

In addition, different measurement instruments can have different acquisition speeds for measurement results: some instruments will acquire dozens or hundreds of measurement results per second, and other instruments will acquire a few measurements per minute. In some cases, the measurement resolution and acquisition speeds for a given instrument will be negatively directly proportional: put differently, as the acquisition speed of the instrument increases, the measurement resolution decreases. For example, a first scanner can have a measurement resolution of approximately 1 mm and acquire 100 points per second, and a second scanner can have a measurement resolution of approximately 1 µm and acquire 1 point per second.

In certain contexts, measurement instruments are used for safety, quality assurance, or other similar purposes, for example to satisfy one or more regulatory requirements. For instance, a particular regulatory framework can place requirements on sizing for components. The regulatory framework can further require that the measurements, taken to ensure that the sizing of the components meets the requirements, are performed with instruments having a predetermined precision, that is to say, having a satisfactory measurement resolution. In some embodiments, the regulatory framework requires that the measurement resolution of the instrument performing a measurement is at least ten (10) times higher than the required tolerance for the component. Because regulatory frameworks can place exacting standards on measurement resolution for measurement instruments, it can be time consuming to perform measurements on a component using a measurement instrument which satisfies the regulatory standards. Conversely, measurement instruments which perform measurements in a more timely fashion can fall short of the regulatory standards required for measuring the component.

The present disclosure provides systems and methods for performing measurements on a component using measurements acquired from different measurement instruments having different measurement resolutions and different acquisition speeds. A scaling factor which relates the measurements to one another is used to generate scaled measurements, which are then output as measurements for the component. By combining measurements obtained from a low-resolution, high-speed instrument with measurements obtained from a high-resolution, low-speed device, a set of combined measurements which satisfy the resolution requirement can be obtained. It should be noted that the use of "high-" and "low-" prefixes in relation to resolution, speed, and the like, as used throughout the present description, signifies comparative values for the resolution, speed, or the like.

Figure 1:
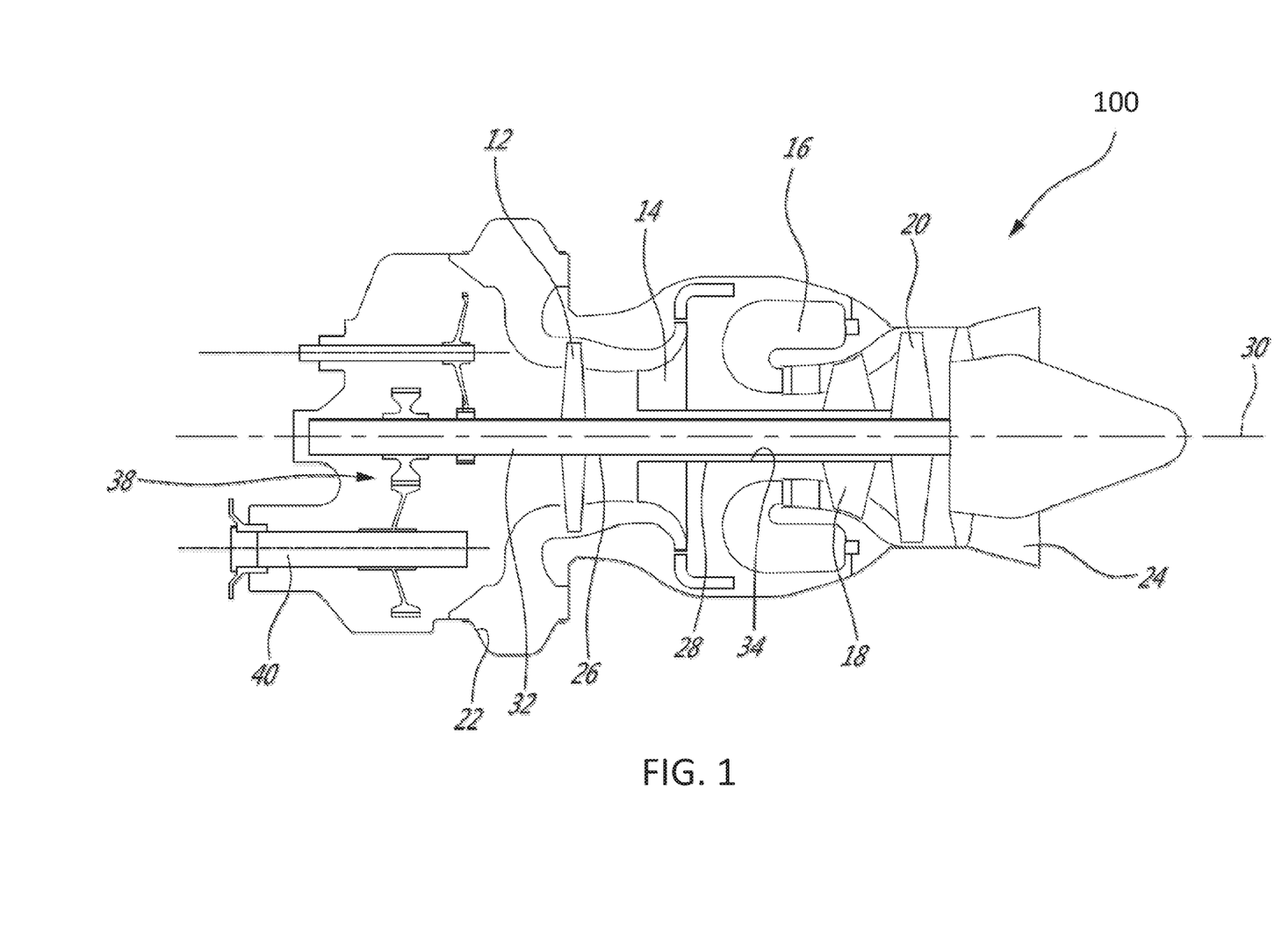
FIG. 1 is a cross-sectional view of an example turboshaft engine of an aircraft.

For context, and with reference to FIG. 1, a gas turbine engine 100 is shown. In this example, the engine 100 is a turboshaft engine generally comprising in serial flow communication a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14, and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The engine 100 has multiple, i.e. two or more, spools which may perform the compression to pressurize the air received through an air inlet 22, and which extract energy from the combustion gases before they exit via an exhaust outlet 24. In the illustrated embodiment, the engine 100 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The engine 100 may include a transmission 38 driven by the low pressure shaft 32 and driving a rotatable output shaft 40. The transmission 38 may vary a ratio between rotational speeds of the low pressure shaft 32 and the output shaft 40.

The gas turbine engine 100 is composed of a plurality of different components, each of which can be required to conform to one or more standards. In some embodiments, the standards are established by the manufacturer of the components, or of the gas turbine engine 100. In some other embodiments, the standards are established by a regulatory agency, for instance in accordance with safety requirements or the like. The standards can dictate values for one or more properties of the components, including length, width, height, thickness, gap, planarity and/or waviness, angle (absolute and/or relative), curvature (including regarding radius, diameter, circumference, arc length, etc.), and the like.

Although the present disclosure discusses techniques for obtaining measurements, including systems and methods for measuring a component, in the context of components for an engine, for instance the gas turbine engine 100, it should be noted that the techniques described herein are applicable in other contexts.

Figure 2:
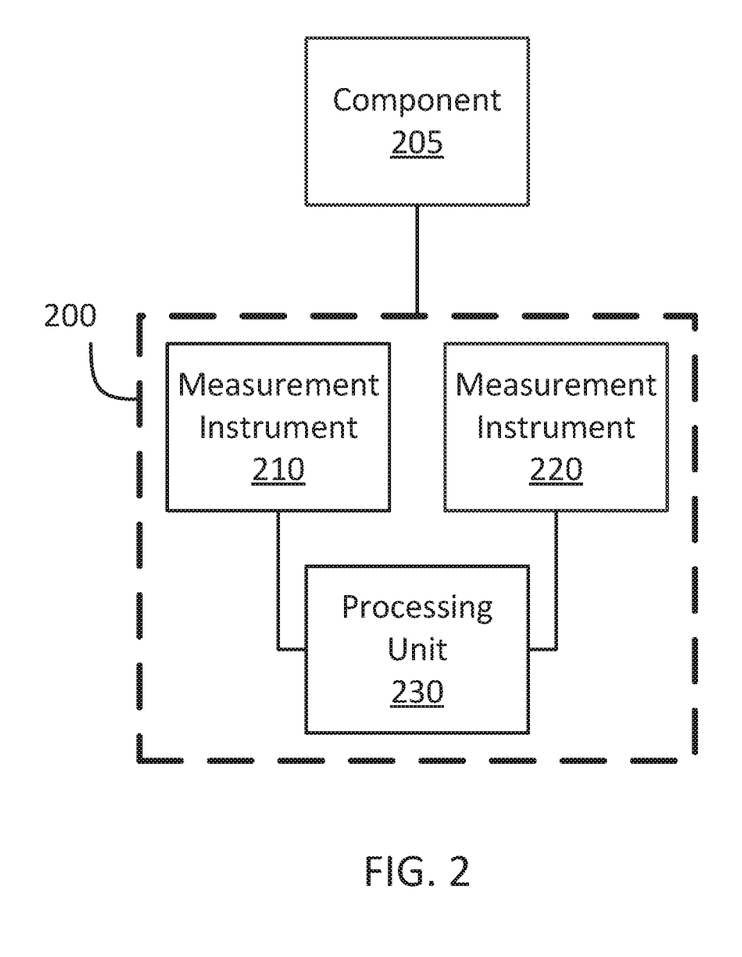
FIG. 2 is a block diagram of an example system for measuring a component.

With reference to FIG. 2, there is shown a measurement system 200, which can be used to perform one or more measurements on a component 205. The component 205 can be any suitable type of component, including a component for the engine 100, or any other type of component. The measurement system 200 is composed of one or more measurement instruments, shown in FIG. 2 as measurement instruments 210 and 220. The measurement instruments 210, 220 can be any suitable type of measurement instrument. The measurement system 200 also includes a processing unit 230 which is coupled to the measurement instruments 210, 220.

The measurement instruments 210, 220 are configured for performing one or more measurement procedures on the component 205 to measure one or more properties of the component 205. In some embodiments, the measurement instruments 210, 220 are separate instruments configured for performing measurements on the component 205. In some other embodiments, the measurement instruments 210, 220 are a single instrument configured to operate in accordance with two different settings, for instance to perform measurements on the component 205 in two different ways. In some further embodiments, the measurement system 200 includes more than two measurement instruments, or one or more measurement instruments which can perform measurements in more than two ways.

When operated, the measurement instruments 210, 220 produce measurements which are based on coordinate systems associated with the measurement instruments 210. In some embodiments, each measurement instrument 210, 220, has its own coordinate system. In some other embodiments, the measurement instruments 210, 220 share a common coordinate system. The coordinate system(s) for the measurement instruments 210, 220 can be predetermined prior to any measurement collection, for instance based on an absolute reference point or the like. Alternatively, the coordinate system(s) for the measurement instruments 210, 220 can be relative coordinate systems, which can be determined based on the collected measurements and at the time of collection. In some cases, one of the measurement instruments 210, 220 has a relative reference frame, and the other has an absolute reference frame. Although, as discussed herein, the reference frame is said to be associated with the measurement instruments 210, 220, it should be understood that in some cases, each set of measurements acquired by a measurement instrument can be associated with a unique or semi-unique reference frame.

For the sake of simplicity in the foregoing discussion, the measurement instrument 210 is considered to be a comparatively high-speed, low-resolution measurement instrument which obtains a first set of measurements; the measurement instrument 220 is considered to be a comparatively low-speed, high-resolution measurement instrument which obtains a second set of measurements. However, this should be understood to be an example, and that in other cases, the measurement instruments 210, 220 can operate differently.

The processing unit 230 is configured for obtaining the first and second sets of measurements from the measurement instruments 210, 220. In some embodiments, the processing unit 230 is coupled to the measurement instruments 210, 220 using one or more wired or wireless communication paths, and is substantially collocated with the measurement instruments 210, 220, as illustrated in FIG. 2. In some other embodiments, the processing unit 230 can be located remotely from the measurement instruments 210, 220, and can be coupled thereto via one or more networks, which can include, for example, the Internet and/or one or more private networks.

The processing unit 230 is also configured for determining a scaling factor which relates the first and second sets of measurements. The scaling factor can be any suitable value which can be used to express the relationship between the first and second sets of measurements provided by the measurement instruments 210, 220. For example, if first set of measurements indicate a larger value for the diameter of the circular portion of the component 205 than the second set of measurements, the scaling factor can be a fractional value. When the fractional value is applied to the diameter as measured by the measurement instrument 210, the diameter as measured by the measurement instrument 220 is obtained.

For example, the measurement instrument 210 is configured for measuring a diameter of a circular portion of the component 205 at a low measurement resolution and at a high acquisition speed to obtain the first set of measurements. The measurement instrument 220 is configured for measuring the same diameter of the same circular portion of the component 205 at a high measurement resolution and at a low acquisition speed to obtain the second set of measurements. The measurement instrument 210 performs a comparatively large number of measurements of the diameter in a given period of time, and the measurement instrument 220 performs a comparatively smaller number of measurements in the same period of time. As a result, the first set of measurements contains more data points than the second set of measurements. The measurement instruments 210, 220 then provide the first and second sets of measurements to the processing unit 230.

The processing unit 230 can use the first and second sets of measurements provided by the measurement instruments 210, 220 to determine the scaling factor which relates the first and second sets of measurements. Because the second set of measurements is of a higher measurement resolution, scaling the first set of measurements to align with the second set of measurements can impart the higher measurement resolution to the first set of measurements. In this fashion, the comparatively higher acquisition speed of the measurement instrument 210 is combined with the comparatively higher measurement resolution of the measurement instrument 220 to produce scaled measurements which include a large number of data points at a high measurement resolution.

In some embodiments, before determining the scaling factor, or as part of that determination, the processing unit 230 aligns coordinate systems of the measurement instruments 210, 220. The processing unit 230 can obtain the coordinate systems for the measurement instruments 210, 220 and then perform alignment thereof. In some cases, one of the coordinate systems is translated to align with the other. In some other cases, both coordinate systems are translated to align with one another. The translation of one or both coordinate systems can be performed in any suitable fashion. In some embodiments, the measurement instruments 210, 220 have fixed reference coordinates which are known to the processing unit 230, and the processing unit 230 stores a translation factor or other value for aligning the coordinate systems of the measurement instruments 210, 220.

The scaling factor can be determined in various ways. In some embodiments, the scaling factor is determined using a point-wise alignment of measurements obtained from the measurement instruments 210, 220. For example, measurements obtained with the higher-resolution measurement instrument are associated with corresponding measurements obtained with the lower-resolution measurement instrument. In some other embodiments, the scaling factor is determined using an area-based scaling factor. For example, measurements obtained with the higher-resolution measurement instrument are used to determine the surface area of a feature of the component 205, which is compared against the surface area of the same feature as determined based on the measurements obtained with the lower-resolution measurement instrument. In some instances, the surface area is determined based on finding a centre of the feature as measured by both measurement instruments 210, 220. In some further embodiments, the scaling factor is determined using an contour- or perimeter-based scaling factor. For example, measurements obtained with the higher-resolution measurement instrument are used to determine the perimeter of a feature of the component 205, which is compared against the perimeter of the same feature as determined based on the measurements obtained with the lower-resolution measurement instrument. Other approaches are also considered.

In some embodiments, the scaling factor is used to scale a point cloud, which is indicative of the contour or dimensions of the component 205. A first point cloud for the component 205 is captured with the low-resolution, high-speed measurement instrument, for instance the measurement instrument 210, and a second point cloud for the component is captured with the high-resolution, low-speed measurement instrument, for instance the measurement instrument 220. The first point cloud can include measurement values for a number of the features of the component 205, for instance many, most, or substantially all of the features of the component 205. The second point cloud can include measurement value for a subset of the features of the component 205 measured in the first point cloud. For instance, the second point cloud can include measurement values for one or more of the features of the component 205 measured in the first point cloud. The scaling factor can be determined by comparing the dimensions of the feature(s) of the component 205 measured in both the first and second point clouds. The scaling factor can then be applied to the first point cloud.

In some embodiments, multiple scaling factors can be determined. For example, if the component 205 includes a plurality of distinct features, one or more scaling factors for the measurements of the measurement instruments 210, 220 can be determined. In some cases, each of the distinct features is associated with a respective scaling factor. In some other cases, one or more scaling factors can be associated with one or more distinct features of the component 205. The different scaling factors can be determined using similar approaches, or using different approaches, as appropriate.

Once the processing unit 230 has determined the scaling factor, the processing unit 230 can apply the scaling factor to the first set of measurements to generate scaled measurements. In embodiments in which the first set of measurements is for two or more features of the component 205, one or more scaling factors can be applied to the first set of measurements, as appropriate. The scaled measurements can then be output by the processing unit 230 as measurement for the component 205. The scaled measurements can be output to a screen or other display device, to a database or other data repository, over a network to a remote computer or the like, or in any other suitable fashion.

Figure 3:
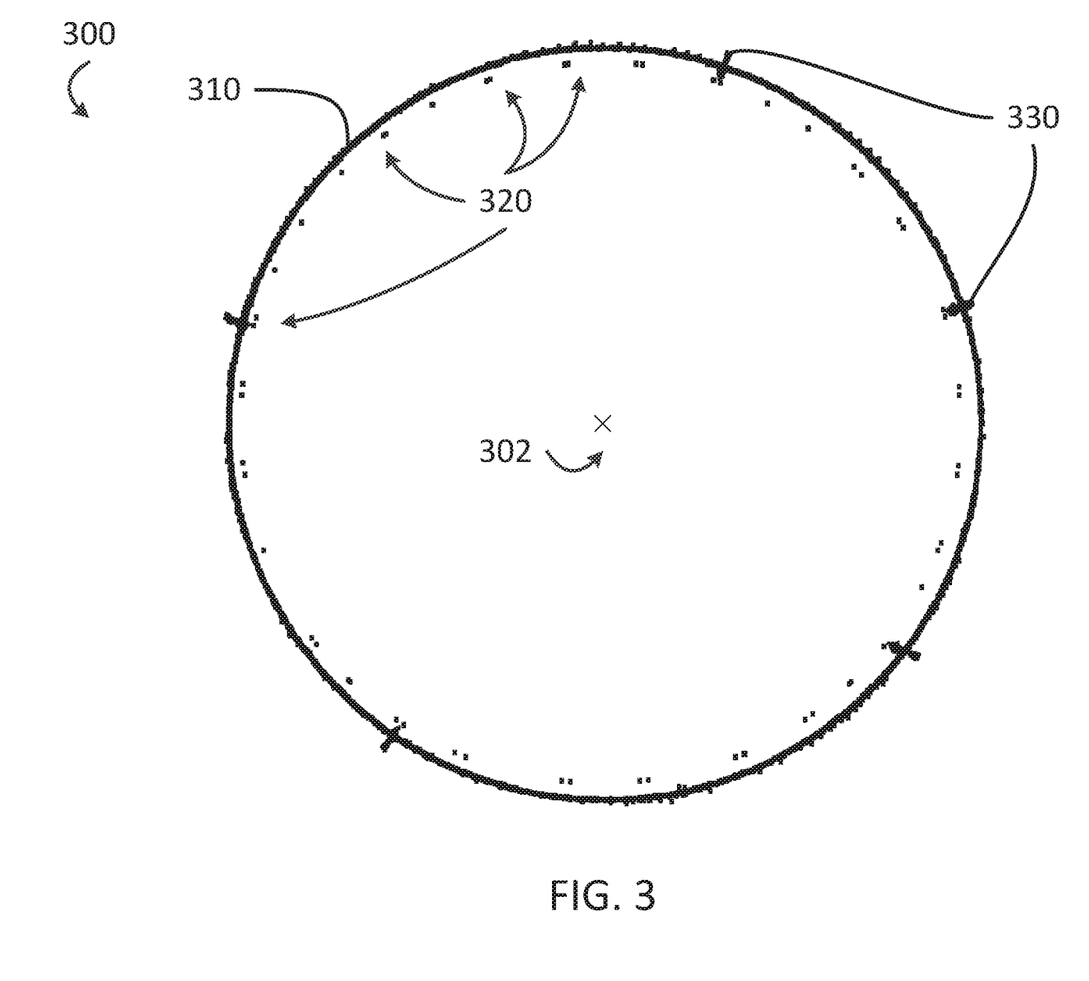
FIG. 3 is an example measurement of an example circular component obtained using the system of FIG. 2.

With reference to FIG. 3, an example measurement of a circular component 300 is illustrated. The measurement includes a first set of measurements 310, consisting of a comparatively large number of data points, and a second set of measurements 320, consisting of a comparatively small number of data points. The measurements 310 can be acquired with the measurement instrument 210, and the measurements 320 can be acquired with the measurement instrument 220.

As illustrated in FIG. 3, the measurements 310 trace a contour of the circular component 300 which is larger than the contour of the circular component 300 traced by the measurements 320. As a result, a scaling factor can be determined which scales the measurements 310 in the direction of arrows 330. For example, the scaling factor can be determined by comparing the area of the circular component 300 as per the measurements 310 versus the area of the circular component 300 as per the measurements 320. In some cases, the areas can be determined based on a centre 302 of the circular component 300. The scaled measurements can then be output as the actual measurements for the circular component 300.

Figure 4:
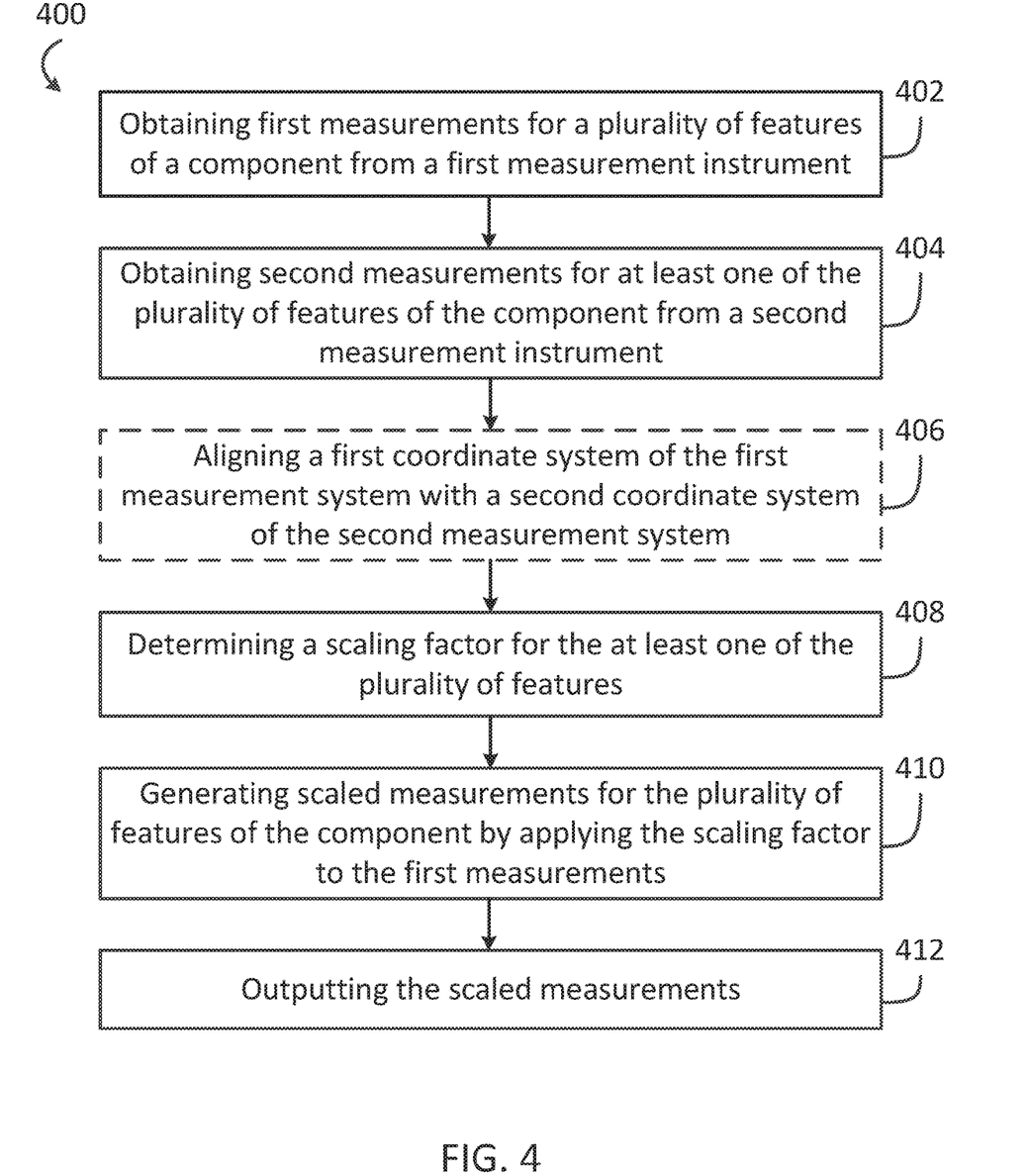
FIG. 4 is a flowchart of an example method for measuring a component, in accordance with at least some embodiments.

With reference to FIG. 4, there is illustrated a method 400 for measuring a component, for instance the component 205. At step 402, first measurements for a plurality of features of the component are obtained from a first measurement instrument, for instance the measurement instrument 210.

At step 404, second measurements for at least one of the plurality of features of the component are obtained from a second measurement instrument, for instance the measurement instrument 220. The measurement instrument 220 has a higher measurement resolution than the measurement instrument 210. In some embodiments, as a result, the measurement instrument 220 has a lower acquisition speed than the measurement instrument 210.

Optionally, at step 406, a first coordinate system, associated with the measurement system 210, is aligned with a second coordinate system, associated with the measurement instrument 220. For example, the first coordinate system is translated to align with the second coordinate system; in another example, the second coordinate system is translated to align with the first. In a further example, both the first and the second coordinate systems are translated to align with one another. In some embodiments, a translation factor for aligning the first and second coordinate system is stored in a data repository, and can be used to align the first and second coordinate systems.

At step 408, a scaling factor for the at least one of the plurality of features is determined. The scaling factor serves to relate the first measurements to the second measurements. The scaling factor can be determined using point-wise comparisons, surface area or perimeter-based comparisons, or any other suitable technique. In some embodiments, more than one scaling factor can be determined, for instance one scaling factor for each of the features of the component 205.

At step 410, scaled measurements for the plurality of features of the component 205 are generated by applying the scaling factor to the first measurements. The scaling factor can be applied to the first measurements using any suitable computational technique or algorithm. At step 412, the scaled measurements are output as the measurements for the component 205. The scaled measurements can be output to a display device, to a data repository, over a network, or in any other suitable fashion.

Figure 5:
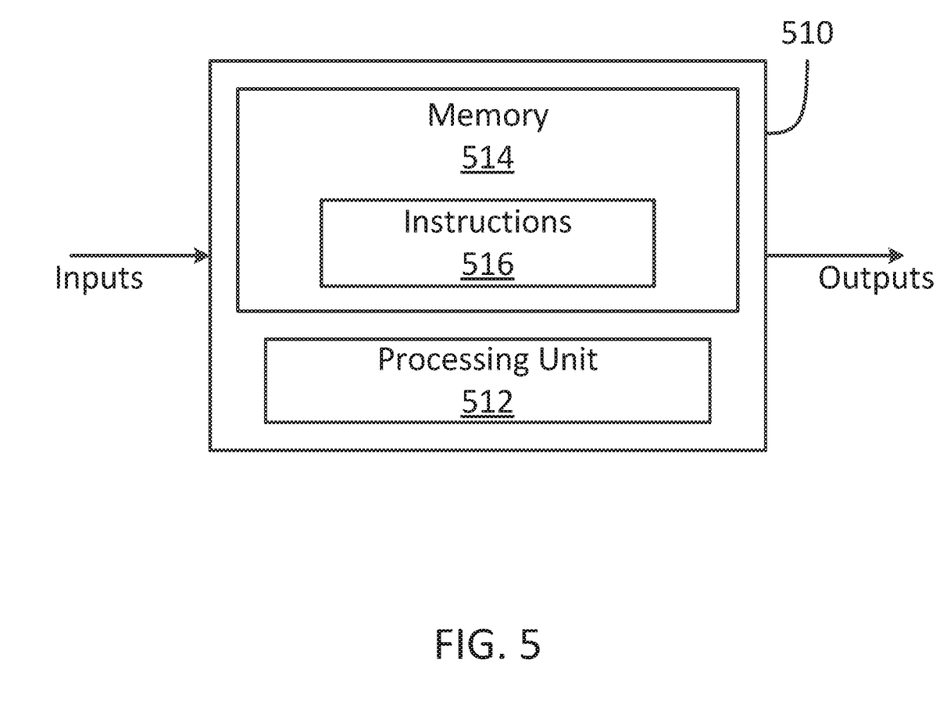
FIG. 5 is a block diagram of an example computing device for implementing the method of FIG. 4.

With reference to FIG. 5, the method 400 may be implemented by a computing device 510, which can embody part or all of the processing unit 230. The computing device 510 comprises a processing unit 512 and a memory 514 which has stored therein computer-executable instructions 516. The processing unit 512 may comprise any suitable devices configured to implement the functionality of the processing unit 230 and/or the functionality described in the method 400, such that instructions 516, when executed by the computing device 510 or other programmable apparatus, may cause the functions/acts/steps performed by the processing unit 230 and/or described in the method 400 as provided herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512.

The methods and systems for measuring a component as described herein may be implemented in a high level procedural or object oriented programming or scripting language, or a combination thereof, to communicate with or assist in the operation of a computer system, for example the computing device 510. Alternatively, the methods and systems described herein may be implemented in assembly or machine language. The language may be a compiled or interpreted language.

Embodiments of the methods and systems described herein may also be considered to be implemented by way of a non-transitory computer-readable storage medium having a computer program stored thereon. The computer program may comprise computer-readable instructions which cause a computer, or more specifically the processing unit 512 of the computing device 510, to operate in a specific and pre-defined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method of measuring a component, comprising:
obtaining first measurements for a plurality of features of the component from a first measurement instrument;
obtaining second measurements for at least one of the plurality of features of the component from a second measurement instrument, the second measurement instrument having a higher measurement resolution than the first measurement instrument;
determining a scaling factor for the at least one of the plurality of features which relates the first measurements to the second measurements;
generating scaled measurements for the plurality of features of the component by applying the scaling factor to the first measurements; and
outputting the scaled measurements as measurements of the component.

2. The method of claim 1, wherein determining the scaling factor comprises determining a pointwise scaling factor for points composing the first measurements and the second measurements.

3. The method of claim 1, wherein determining the scaling factor comprises determining an area-based scaling factor based on relative areas of the at least one of the plurality of features based on the first measurements and the second measurements.

4. The method of claim 1, wherein determining the scaling factor comprises determining a plurality of scaling factors associated with different ones of the plurality of features.

5. The method of claim 4, wherein generating scaled measurements comprises applying different ones of the plurality of scaling factors to different subsets of the first measurements.

6. The method of claim 1, wherein the measurement resolution of the second measurement instrument is selected based on a regulatory standard.

7. The method of claim 6, wherein the regulatory standard requires the measurement resolution to be at least ten times higher than a required tolerance for the component.

8. The method of claim 1, further comprising aligning a first coordinate system of the first measurement system with a second coordinate system of the second measurement instrument.

9. A system for measuring a component, comprising:
a processing unit; and a non-transitory computer-readable medium communicatively coupled to the processing unit and comprising computer-readable program instructions executable by the processing unit for:
- obtaining first measurements for a plurality of features of the component from a first measurement instrument;
- obtaining second measurements for at least one of the plurality of features of the component from a second measurement instrument, the second measurement instrument having a higher measurement resolution than the first measurement instrument;
- determining a scaling factor for the at least one of the plurality of features which relates the first measurements to the second measurements;
- generating scaled measurements for the plurality of features of the component by applying the scaling factor to the first measurements; and
- outputting the scaled measurements as measurements of the component.

10. The system of claim 9, wherein determining the scaling factor comprises determining a pointwise scaling factor for points composing the first measurements and the second measurements.

11. The system of claim 9, wherein determining the scaling factor comprises determining an area-based scaling factor based on relative areas of the at least one of the plurality of features based on the first measurements and the second measurements.

12. The system of claim 9, wherein determining the scaling factor comprises determining a plurality of scaling factors associated with different ones of the plurality of features.

13. The system of claim 12, wherein generating scaled measurements comprises applying different ones of the plurality of scaling factors to different subsets of the first measurements.

14. The system of claim 9, wherein the measurement resolution of the second measurement instrument is selected based on a regulatory standard.

15. The system of claim 14, wherein the regulatory standard requires the measurement resolution to be at least ten times higher than a required tolerance for the component.

16. The system of claim 9, wherein the program instructions are further executable for aligning a first coordinate system of the first measurement system with a second coordinate system of the second measurement instrument.

17. A system for measuring a component, comprising:
- a first measurement instrument having a first measurement resolution, the first measurement instrument configured for obtaining first measurements for a plurality of features of the component;
- a second measurement instrument having a second measurement resolution higher than the first measurement resolution, the second measurement instrument configured for obtaining second measurements for at least one of the plurality of features of the component; and
- a processing system configured for:
  - determining a scaling factor for the at least one of the plurality of features which relates the first measurements to the second measurements;
  - generating scaled measurements for the plurality of features of the component by applying the scaling factor to the first measurements; and
  - outputting the scaled measurements as measurements of the component.

18. The system of claim 15, wherein determining the scaling factor comprises determining a pointwise scaling factor for points composing the first measurements and the second measurements.

19. The system of claim 15, wherein determining the scaling factor comprises determining an area-based scaling factor based on relative areas of the at least one of the plurality of features based on the first measurements and the second measurements.

20. The system of claim 15, wherein determining the scaling factor comprises determining a plurality of scaling factors associated with different ones of the plurality of features, and wherein generating scaled measurements comprises applying different ones of the plurality of scaling factors to different subsets of the first measurements.

* * * * *